(12) United States Patent
Martin

(10) Patent No.: US 12,001,446 B2
(45) Date of Patent: Jun. 4, 2024

(54) SYSTEM AND METHOD FOR EXTRACTING DATA FROM INVOICES AND CONTRACTS

(71) Applicant: Thinking Machine Systems Ltd., London (GB)

(72) Inventor: Richard Martin, London (GB)

(73) Assignee: THINKING MACHINE SYSTEMS LTD., London (GB)

(*) Notice: Subject to any disclaimer, the term of this patent is extended or adjusted under 35 U.S.C. 154(b) by 84 days.

(21) Appl. No.: 17/719,196

(22) Filed: Apr. 12, 2022

(65) Prior Publication Data

US 2023/0325401 A1    Oct. 12, 2023

(51) Int. Cl.
| | | |
|---|---|---|
| *G06F 16/00* | (2019.01) | |
| *G06F 16/25* | (2019.01) | |
| *G06F 16/28* | (2019.01) | |
| *G06N 5/022* | (2023.01) | |
| G06F 40/279 | (2020.01) | |
| G06V 30/10 | (2022.01) | |
| G06V 30/416 | (2022.01) | |

(52) U.S. Cl.
CPC .......... *G06F 16/254* (2019.01); *G06F 16/285* (2019.01); *G06N 5/022* (2013.01); *G06F 40/279* (2020.01); *G06V 30/10* (2022.01); *G06V 30/416* (2022.01)

(58) Field of Classification Search
CPC .............................. G06F 16/254; G06F 16/285
USPC ........................................................ 707/602
See application file for complete search history.

(56) References Cited

U.S. PATENT DOCUMENTS

| 10,289,633 | B1 | 5/2019 | Reiner | |
|---|---|---|---|---|
| 2002/0123919 | A1 | 9/2002 | Brockman et al. | |
| 2017/0323006 | A1* | 11/2017 | Guzman | G06F 40/186 |
| | | | | 707/707 |
| 2018/0081861 | A1* | 3/2018 | Danielyan | G06F 40/295 |
| | | | | 707/707 |

(Continued)

FOREIGN PATENT DOCUMENTS

| EP | 2 187 613 A1 | 5/2010 |
|---|---|---|
| EP | 3 494 531 | 2/2018 |

(Continued)

OTHER PUBLICATIONS

International Search Report and Written Opinion dated Jul. 14, 2023 for PCT/GB2023/050954.

*Primary Examiner* — Alexandria Y Bromell
(74) *Attorney, Agent, or Firm* — Haynes and Boone, LLP

(57) ABSTRACT

A data processing system and corresponding method are presented. The system includes a communication module to retrieve a first document and a second document; a first database to store the first and second documents; and a processor. The processor extracts first data from the first document, orders the first data into a first data structure using a set of translation tables. The processor also extracts second data from the second document, orders the second data into a second data structure using the set of translation tables. The first data structure and the second data structure have a first and a second format, respectively. The first data and the second data comprise a plurality of entities, and the processor is configured to compare entities from the first data structure and the second data structure to identify matching entities.

20 Claims, 24 Drawing Sheets

(56) References Cited

U.S. PATENT DOCUMENTS

| | | | |
|---|---|---|---|
| 2018/0144314 A1* | 5/2018 | Miller | G06Q 20/405 707/707 |
| 2018/0165585 A1* | 6/2018 | Saxena | G06Q 30/0269 707/707 |
| 2018/0165586 A1* | 6/2018 | Saxena | G06N 20/20 707/707 |
| 2018/0341688 A1* | 11/2018 | Ganesh | G06F 16/2465 707/707 |
| 2019/0114360 A1* | 4/2019 | Garg | G06F 16/1794 707/707 |
| 2019/0251182 A1* | 8/2019 | Ray | G06F 40/169 707/707 |
| 2020/0133964 A1* | 4/2020 | Lee | G06F 16/355 707/707 |
| 2020/0234183 A1* | 7/2020 | Ghatage | G06N 20/00 707/707 |
| 2021/0271654 A1* | 9/2021 | Gupta | G06F 16/288 707/707 |
| 2022/0019624 A1* | 1/2022 | Gwozdz | G06F 40/30 707/707 |
| 2022/0076007 A1* | 3/2022 | Rout | G06F 40/30 707/707 |
| 2023/0307103 A1* | 9/2023 | Wilkinson | G06F 16/254 707/602 |

FOREIGN PATENT DOCUMENTS

| | | |
|---|---|---|
| WO | 2017201012 A1 | 11/2017 |
| WO | 2021138163 A1 | 7/2021 |

\* cited by examiner

| | PricePlanFamilyName | PricePlanName | SourceTable0 | SourceTable1 | SourceTable2 | SourceTable3 |
|---|---|---|---|---|---|---|
| 610 | Business Advance Value | Business Advance MBB Value | Travelling and Using Devices Abroad | SourceTable1 Roaming Zone Europe Zone 1: £0.00 Europe Zone 2: £2.50 Daily Charge per Connection (for non BusinessTraveller versions of Business Advance Value and Business Advance Extra) £0.00 | | |
| 611 | Business Advance Value | Business Advance MBB Value | Travelling and Using Devices Abroad | Daily Charge per Connection (for BusinessTraveller versions of Business Advance Value and Business Advance Extra) Roaming Zone Europe Zone 1: £0.00 Europe Zone 2: £2.50 Daily Charge per Connection (for non BusinessTraveller versions of Business Advance Value and Business Advance Extra) £0.00 | 0p per minute | Making calls in European d Back to the UK |
| 612 | Business Advance Value | Business Advance MBB Value | Travelling and Using Devices Abroad | Daily Charge per Connection (for BusinessTraveller versions of Business Advance Value and Business Advance Extra) Roaming Zone Europe Zone 1: £0.00 Europe Zone 2: £2.50 Daily Charge per Connection (for non BusinessTraveller versions of Business Advance Value and Business Advance Extra) £0.00 | 0p per minute | Making calls in European d Back to the UK |
| | Business Advance Value | Business Advance MBB Value | Travelling and Using Devices Abroad | Daily Charge per Connection (for BusinessTraveller versions of Business Advance Value and Business Advance Extra) | 12p per minute USA and Canada | Making Calls From Europe to USA and Rest of World |

| | | | | | | |
|---|---|---|---|---|---|---|
| 613 | Business Advance Traveller Extra SIM Only | Business Advance Traveller Extra 10 | Travelling and Using Devices Abroad | Roaming Zone World Zone £5.00 Daily charge per Connection | 25p per minute Calls to any other worldwide destination | Making Calls to other Country with international Discount 4 |
| 614 | Business Advance Traveller Extra SIM Only | Business Advance Traveller Extra 10 | Travelling and Using Devices Abroad | Roaming Zone World Zone £5.00 Daily charge per Connection | 0p | Receiving calls and texts in Country (No Daily Charge will apply) + |
| 615 | Business Advance Traveller Extra SIM Only | Business Advance Traveller Extra 10 | Travelling and Using Devices Abroad | Roaming Zone World Zone £5.00 Daily charge per Connection | 0p per text in Country to a UK mobile | Sending texts |
| 616 | Business Advance Traveller Extra SIM Only | Business Advance Traveller Extra 5 | Travelling and Using Devices Abroad | Roaming Zone World Zone £5.00 Daily charge per Connection | 50p per minute Calls to any other worldwide destination | Making Calls to other Country |
| 617 | Business Advance Traveller Extra SIM Only | Business Advance Traveller Extra 10 | Travelling and Using Devices Abroad | Roaming Zone World Zone £5.00 Daily charge per Connection | 29.17p per text when sending in Country to any other worldwide destination or an international mobile number | Sending texts |
| 618 | Business Advance Traveller Extra SIM Only | Business Advance Traveller Extra 10 | Travelling and Using Devices Abroad | Roaming Zone World Zone £5.00 Daily charge per Connection | Use UK Data Bundle then charged £12.77 per GB | Using the internet |
| 619 | Business Advance Traveller Extra SIM Only | Business Advance Traveller Extra 10 | Travelling and Using Devices Abroad | Roaming Zone World Zone £5.00 Daily charge per Connection | 29.17p per text when sending from Europe to any other worldwide destination or an international mobile number | Sending texts |

Primitive Entities

| ServiceReference | ParentServiceReference |
|---|---|
| | |
| 610 | Making calls in European d Back to the UK |
| 611 | Making calls in European d Back to the UK |
| 612 | Making Calls From Europe to USA and Rest of World |
| USA and Canada | |

Entity Relationships

| OffersRate | ChargedPerUOM | RoamingZone |
|---|---|---|
| 0p | per minute | EuropeZone 1 |
| 0p | per minute | EuropeZone 2 |
| 12p | per minute | EuropeZone 1 |

600

| | | | | |
|---|---|---|---|---|
| 613 | Calls to any other worldwide destination | Making Calls to other Country | 25p | per minute | World Zone |
| 614 | | Receiving calls and texts in Country | 0p | | World Zone |
| 615 | in Country to a UK mobile | Sending texts | 0p | per text | World Zone |
| 616 | sending in Country to an international mobile | Sending texts | 50p | per minute | World Zone |
| 617 | sending in Country to any other worldwide destination | Sending texts | 29.17p | per text | World Zone |
| 618 | | Using the internet | £12.77 | per GB | World Zone |
| 619 | sending from Europe to an international mobile number | Sending texts | 29.17p | per text | World Zone |

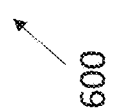

TRANSLATION TABLE: SERVICE REFERENCE DEFINITION

| ServiceReference | Contains | Contains1 |
|---|---|---|
| Europe Zone 2 | isLocationRef | |
| Making calls in European dBack to the UK | isServiceRef | isLocationRef |
| Making Calls From Europe to USA and Rest of World | isServiceRef | isLocationRef |
| Receiving calls and texts in Europe | isServiceRef | isLocationRef |
| Sending texts | isServiceRef | |
| Using the internet | isServiceRef | |
| Making calls in Country and back to the UK | isServiceRef | isLocationRef |
| Making Calls to other Country | isServiceRef | isLocationRef |
| Receiving calls and texts in Country | isServiceRef | isLocationRef |
| USA and Canada | isLocationRef | |
| Calls to any other worldwide destination | isServiceRef | isLocationRef |
| in Europe to a UK mobile | isLocationRef | isLocationRef |
| from Europe to any other worldwide destination | isLocationRef | |
| sending in Country to any other worldwide destination | isServiceRef | |
| sending from Europe to an international mobile number | isServiceRef | isLocationRef |
| sending in Country to an international mobile number | isServiceRef | isLocationRef |
| Europe | isLocationRef | |
| in Country to a UK mobile | isServiceRef | isLocationRef |
| Europe Zone 1 | isLocationRef | |
| World Zone | isLocationRef | |

TRANSLATION TABLE- SERVICE ATTRIBUTES

| ServiceRef | ServiceAction | ServiceOrigination | ServiceDestination | ServiceDestinationTechnology |
|---|---|---|---|---|
| Making calls in European dBack to the UK | Making calls | Europe | UK | |
| Making Calls From Europe to USA and Rest of World | Making calls | Europe | USA | |
| Making Calls From Europe to USA and Rest of World | Making calls | Europe | Rest of World | |
| Receiving calls and texts in Europe | Receiving calls | Europe | Europe | |
| Receiving calls and texts in Europe | Receiving texts | Europe | Europe | |
| Making calls in Country and back to the UK | Making calls | Country | UK | |
| Making Calls to other Country | Making calls | Country | Country | |
| Receiving calls and texts in Country | Receiving calls | Country | Country | |
| Receiving calls and texts in Country | Receiving texts | Country | Country | |
| Calls to any other worldwide destination | Making calls | Europe | Rest of World | |
| in Europe to a UK mobile | | Europe | UK | mobile |
| from Europe to any other worldwide destination | | Europe | Rest of World | |
| sending in Country to any other worldwide destination | | Country | Rest of World | |
| sending from Europe to an international mobile number | | Europe | international mobile number | mobile number |
| sending in Country to an international mobile number | | Country | international mobile number | mobile number |
| Sending texts | Sending texts | | | |
| in Country to a UK mobile | | Country | UK | mobile |

TRANSLATION TABLE- SERVICE TO LOCATION MAPPING

| ServiceRef | LocationInstance |
|---|---|
| Making calls in European dBack to the UK | Europe |
| Making calls in European dBack to the UK | UK |
| Making Calls From Europe to USA and Rest of World | Europe |
| Making Calls From Europe to USA and Rest of World | USA |
| Making Calls From Europe to USA and Rest of World | All Countries Except USA & Europe |
| Receiving calls and texts in Europe | Europe |
| Making calls in Country and back to the UK | Country |
| Making calls in Country and back to the UK | UK |
| Making Calls to other Country | Country |
| Receiving calls and texts in Country | Country |
| USA and Canada | USA |
| USA and Canada | Canada |
| Calls to any other worldwide destination | Rest of World |
| in Europe to a UK mobile | Europe |
| in Europe to a UK mobile | UK |
| from Europe to any other worldwide destination | Europe |
| from Europe to any other worldwide destination | All Countries Except Europe |
| sending in Country to any other worldwide destination | Country |
| sending in Country to any other worldwide destination | All Countries Except Origination Country |
| sending from Europe to an international mobile number | Europe |
| sending from Europe to an international mobile number | All Countries Except Origination Country |
| sending in Country to an international mobile number | Country |
| sending in Country to an international mobile number | All Countries Except Origination Country |
| Europe Zone 2 | Europe Zone 2 |
| Europe Zone 1 | Europe Zone 1 |
| Europe | Europe |

TRANSLATION TABLE: LOCATION MAPPING

| LocationRef | LocationInstance | LocationRule |
|---|---|---|
| Europe | Europe | |
| Country | Any Country | isLocationRule |
| UK | UK | |
| USA | USA | |
| Rest of World | Any Country Not USA or Canada or Europe | isLocationRule |
| International mobile number | Any Country Not ServiceOrigination | isLocationRule |
| Europe Zone 2 | Europe Zone 2 | |
| Europe Zone 1 | Europe Zone 1 | |
| Rest of World 1 | Rest of World 1 | |
| Rest of World 2 | Rest of World 2 | |
| World Zone | Any Country Not Europe | isLocationRule |
| USA and Canada | USA | |
| USA and Canada | Canada | |

↑ 740

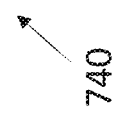

Figure 7D

| TRANSLATION TABLE: LOCATION RULE DEFINTION ||
| --- | --- |
| LocationRef | ExcludedLocation |
| World Zone | Europe |
| Rest of World | USA |
| Rest of World | Canada |
| Rest of World | Europe |

TRANSLATION TABLE: LOCATION TO COUNTRY MAPPING

| CountryInstance | LocationInstance | Bosnia and Herzegovina | Europe Zone 2 | Europe |
|---|---|---|---|---|
| ... | ... | ... | | |
| Austria | Europe Zone 1 | | Europe Zone 2 | |
| Belgium | Europe Zone 1 | Faroe Islands | Europe Zone 2 | Romania | Europe |
| Bulgaria | Europe Zone 1 | Guernsey | Europe Zone 2 | Slovakia | Europe |
| Canary Islands | Europe Zone 1 | Isle of Man | Europe Zone 2 | Slovenia | Europe |
| Croatia | Europe Zone 1 | Jersey | Europe Zone 2 | Spain (inc. Balearic Islands) | Europe |
| Cyprus | Europe Zone 1 | San Marino | Europe Zone 2 | Balearic Islands | Europe |
| Czech Republic | Europe Zone 1 | Switzerland | Europe Zone 2 | Sweden | Europe |
| Denmark | Europe Zone 1 | Turkey | Europe Zone 2 | Albania | Europe |
| Estonia | Europe Zone 1 | USA | USA & Canada | Bosnia and Herzegovina | Europe |
| Finland | Europe Zone 1 | Canada | USA & Canada | Faroe Islands | Europe |
| France (Monaco) | Europe Zone 1 | USA | USA and Canada | Guernsey | Europe |
| Monaco | Europe Zone 1 | Canada | USA and Canada | Isle of Man | Europe |
| Germany | Europe Zone 1 | Australia | Asia Pacific | Jersey | Europe |
| Gibraltar | Europe Zone 1 | New Zealand | Asia Pacific | San Marino | Europe |
| Greece | Europe Zone 1 | South Africa | Asia Pacific | Switzerland | Europe |
| Hungary | Europe Zone 1 | Singapore | Asia Pacific | Turkey | Europe |
| Iceland | Europe Zone 1 | Taiwan | Asia Pacific | United Kingdom | UK |
| Italy (inc. Vatican City) | Europe Zone 1 | Thailand | Asia Pacific | England | England |
| Vatican City | Europe Zone 1 | Andorra | Rest of World Zone 2 | Wales | Wales |
| Latvia | Europe Zone 1 | Belize | Rest of World Zone 2 | Scotland | Scotland |
| Liechtenstein | Europe Zone 1 | Bhutan | Rest of World Zone 2 | Northern Ireland | Northern Ireland |
| | | Burundi | Rest of World Zone 2 | All other countries | Rest of World 1 |

760 figure 7F

| destination | price_plan_name | service_bundle | currency | amount |
|---|---|---|---|---|
| "Canada" | "Business Traveller" | ContractServiceBundle_2" | "E" | "0.12" |
| "Canada" | "Business Traveller" | ContractServiceBundle_3" | "E" | "0.08" |
| "Canada" | "Business Traveller" | ContractServiceBundle_2" | "E" | "0.06" |
| "Canada" | "Business Traveller" | ContractServiceBundle_2" | "E" | "0.1" |
| "Canada" | "Business Traveller" | ContractServiceBundle_3" | "E" | "0.09" |
| "Canada" | "Business Traveller" | ContractServiceBundle_2" | "E" | "0.12" |
| "Canada" | "Business Traveller" | ContractServiceBundle_3" | "E" | "0.08" |
| "Canada" | "Business Traveller" | ContractServiceBundle_2" | "E" | "0.06" |
| "Canada" | "Business Traveller" | ContractServiceBundle_3" | "E" | "0.1" |
| "Canada" | "Business Traveller" | ContractServiceBundle_2" | "E" | "0.09" |
| "Canada" | "Business Traveller" | ContractServiceBundle_2" | "E" | "0.12" |
| "Canada" | "Business Traveller" | ContractServiceBundle_3" | "E" | "0.08" |
| "Canada" | "Business Traveller" | ContractServiceBundle_5" | "E" | "0.06" |
| "Canada" | "Business Traveller" | ContractServiceBundle_3" | "E" | "0.1" |
| "Canada" | "Business Traveller" | ContractServiceBundle_4" | "E" | "0.09" |

| includes | conditional_currency | conditional_amount | conditional_rate | conditional_includes | conditional_origins |
|---|---|---|---|---|---|
| "outgoing call;calls;per n" | "£" | "0.0" | | | "Europe Zone 1" |
| "per minute;outgoing call" | "£" | "0.0" | ContractFeature_Conditi "" | "Europe Zone 1" |
| "per minute;outgoing call" | "£" | "0.0" | ContractFeature_Conditi "" | "Europe Zone 1" |
| "outgoing call;per minute" | "£" | "0.0" | ContractFeature_Conditi "" | "Europe Zone 1" |
| "per minute;outgoing call" | "£" | "0.0" | ContractFeature_Conditi "per connection;daily" | "Europe Zone 2" |
| "outgoing call;calls;per n" | "£" | "0.0" | ContractFeature_Conditi "per connection;daily" | "Europe Zone 2" |
| "per minute;outgoing call" | "£" | "0.0" | ContractFeature_Conditi "per connection;daily" | "Europe Zone 2" |
| "outgoing call;per minute" | "£" | "2.5" | ContractFeature_Conditi "per connection;daily" | "Europe Zone 2" |
| "per minute;outgoing call" | "£" | "2.5" | ContractFeature_Conditi "daily;per connection" | "Europe Zone 2" |
| "outgoing call;calls;per n" | "£" | "2.5" | ContractFeature_Conditi "daily;per connection" | "Europe Zone 2" |
| "per minute;outgoing call" | "£" | "2.5" | ContractFeature_Conditi "daily;per connection" | "Europe Zone 2" |
| "outgoing call;per minute" | "£" | "5.0" | ContractFeature_Conditi "daily;per connection" | "Europe Zone 2" |
| "outgoing call;other cour" | "£" | "5.0" | ContractFeature_Conditi "daily;per connection" | "World Zone" |
| "per minute;roaming;call" | "£" | "5.0" | ContractFeature_Conditi "daily;per connection" | "World Zone" |
| "calls;per minute;outgoin" | "£" | "5.0" | ContractFeature_Conditi "daily;per connection" | "World Zone" |

| Classes | Attributes | Primitive Entities |  | Classes | Attributes | Primitive Entities |
|---|---|---|---|---|---|---|
| Line item type | Summary | section heading |  | Usage | date | date |
|  | Detailed | section heading |  |  | time | time |
|  | Overview | section heading |  |  | origination | location |
|  | Breakdown | section heading |  |  | destination | location |
| Product | product_description | block of text |  |  | duration |  |
|  | charge_start_date | date |  |  | rate |  |
|  | charge_end_date | date |  |  | charge | money |
|  | volume | number |  |  | volume | money |
|  | unit of measure |  |  |  | unit_of_measure | number |
|  | product_rate | money |  |  | action | block of text |
|  | product_charge_pre_tax | money |  |  | incoming_call | block of text |
|  | product_charge_post_tax | money |  | Bill | account_number | block of text |
|  | product_category | section heading |  |  | bill_number | block of text |
| Service | service_number |  |  |  | bill_address | block of text |
|  | service_address | location address |  |  | due_date | location address |
|  | username | name |  |  | previous_balance | date |
|  | price_plan | product |  |  | balance_brought_forward | money |
|  | service_category | section heading |  |  | payment_received | money |
|  | sim_card_number | long number |  |  | balance_outstanding | money |
|  |  |  |  |  | tax_included | money |
|  |  |  |  |  | total_amount_owing | money |

| | | |
|---|---|---|
| Cost Centre | cost_centre | section heading |
| | cost_centre_parent1 | section heading |
| | cost_centre_parent2 | section heading |
| | cost_centre_parent[x] | section heading |
| Tax | tax_rate_name | |
| | tax_charge_amount | money |
| | tax_rate_percentage | percentage |
| Contract | contract_start_date | date |
| | contract_end_date | date |
| | price_plan | product |
| Sharing | usage_type | |
| | allowance_amount | decimal number |
| | allowance_used | decimal number |
| | allowance_excess | decimal number |
| | charge_before | money |
| | charge_after | money |
| | savings_amount | money |
| Balance | starting_balance | money |
| | credit_amount | money |
| | debit_amount | money |
| | current_balance | money |
| | start_date | date |
| | end_date | date |

| | | |
|---|---|---|
| Credit | credit_description | block of text |
| | credit_amount | money |
| | credit_date | date |
| Refund | refund_description | block of text |
| | refund_amount | money |
| | refund_date | date |
| Legend | legend_code | block of text |
| | code_description | block of text |
| Discount | discount_name | block of text |
| | discount_amount_pre_tax | money |
| | discount_amount_post_tax | money |
| | eligible_charges | money |
| | earned_discount | money |
| Supplier | supplier_name | organization |
| | company_registration_number | block of text |
| | supplier_country | block of text |
| | supplier_address | block of text |

Figure 9B

| COST_CENTRE | SERVICE_NUMBER | USAGE_ACTION | BILL_ITEM_REF | DATE | TIME_OF_DAY | DESTINATION_ORIGINATION | DESTINATION_LOCATION | DESTINATION_NUMBER | VOLUME | UNIT_OF_MEASURE | CHARGE |
|---|---|---|---|---|---|---|---|---|---|---|---|
| ACME DEPARTMENT UK | <Masked Mobile PI>Making calls | 1103 | 07 Jul | 08:39 am | France | USA | 1305430-<Masked> | 55998 | Seconds | 0.94 |
| ACME DEPARTMENT UK | <Masked Mobile PI>Making calls | 5203 | 03 Jul | 10:18 am | France | USA | 6097768-<Masked> | 19633 | Seconds | 1.44 |
| ACME DEPARTMENT UK | <Masked Mobile PI>Making calls | 689 | 24 Jun | 11:00 pm | France | USA | 8011639-<Masked> | 15988 | Seconds | 7.80 |
| ACME DEPARTMENT UK | <Masked Mobile PI>Making calls | 690 | 28 Jun | 11:15 am | France | USA | 8011619-<Masked> | 5383 | Seconds | 1.88 |
| ACME DEPARTMENT UK | <Masked Mobile PI>Making calls | 691 | 30 Jun | 10:37 am | France | USA | 8011463-<Masked> | 64041 | Seconds | 2.19 |
| ACME DEPARTMENT UK | <Masked Mobile PI>Making calls | 7194 | 01 Jul | 11:06 am | France | New Zealand | 6427860-<Masked> | 26938 | Seconds | 2.46 |
| ACME DEPARTMENT UK | <Masked Mobile PI>Making calls | 7195 | 01 Jul | 11:08 am | France | New Zealand | 6427869-<Masked> | 27280 | Seconds | 21.00 |
| ACME DEPARTMENT UK | <Masked Mobile PI>Making calls | 7196 | 01 Jul | 11:28 am | France | New Zealand | 6427820-<Masked> | 19013 | Seconds | 12.76 |
| ACME DEPARTMENT UK | <Masked Mobile PI>Making calls | 7197 | 02 Jul | 11:57 am | France | New Zealand | 6427793-<Masked> | 18226 | Seconds | 45.72 |
| ACME DEPARTMENT UK | <Masked Mobile PI>Making calls | 7198 | 12 Jul | 11:03 am | France | New Zealand | 6427593-<Masked> | 88573 | Seconds | 7.61 |
| ACME DEPARTMENT UK | <Masked Mobile PI>Making calls | 7199 | 13 Jul | 11:19 am | France | New Zealand | 6420428-<Masked> | 70399 | Seconds | 1.43 |
| ACME DEPARTMENT UK | <Masked Mobile PI>Making calls | 4368 | 30 Jun | 03:37 pm | France | Singapore | 9188845-<Masked> | 38911 | Seconds | 7.68 |
| ACME DEPARTMENT UK | <Masked Mobile PI>Making calls | 4369 | 03 Jul | 03:49 pm | France | Singapore | 9178899-<Masked> | 37564 | Seconds | 5.50 |
| ACME DEPARTMENT UK | <Masked Mobile PI>Making calls | 4370 | 13 Jul | 01:48 pm | France | Singapore | 9188845-<Masked> | 77891 | Seconds | 9.04 |
| ACME DEPARTMENT UK | <Masked Mobile PI>Making calls | 4371 | 13 Jul | 06:06 pm | France | Singapore | 9188845-<Masked> | 71707 | Seconds | 13.12 |

| | | | |
|---|---|---|---|
| Invoice | Usage | Origination | France  1101 |
| | Usage | Destination | USA  1103 |
| | Usage | Action | Making call |
| | Usage | Volume | 5505.35 |
| | Usage | Unit of Measure | Minutes |
| | Supplier | Supplier name | Vodafone |
| | Supplier | supplier_country | United Kingdom  1102 |
| Contract | | Service Bundle | Making calls from Europe to USA and Canada |
| | | Rates | {188 rate options returned with various dependencies} |
| | | Conditions | {5 conditions applicable to rates} |
| | | Discounts | {0 discounts} |
| | | Eligibility | {5 eligibility clauses} |
| | | Price Plan | Business Advance |
| | | Supplier | Vodafone UK |

SYSTEM AND METHOD FOR EXTRACTING DATA FROM INVOICES AND CONTRACTS

TECHNICAL FIELD

The present disclosure relates to a method and corresponding system for processing data from different documents, in particular from documents of different types having different document structures.

BACKGROUND

Organisations often rely on various service providers to cater for specific needs, for instance for providing telecommunication services, information and communication technology (ICT), contingent labour, or other service contracts. Currently, it is difficult and time consuming for companies to check contractual obligations, product services and expenditure of services that are contractually driven by complex pricing arrangements, such as bundled service offerings, tiered discounts, time-based rating and so on.

Comparing data from different types of products, contracts, sales, marketing, among others is technically challenging. It may be possible to find management tools for specific documents individually, for instance a classification engine for products, contract management systems for contracts, CRM for sales, robotic process automation for orders, and so on. However, each one of these tools are managed by their own department, causing data to become compartmentalised. Managing the data centrally is challenging at least because there is no common agreement on how to define classification.

Solving this problem requires a new way of gathering and processing data from documents having different documents structures.

SUMMARY

According to a first aspect of the disclosure, there is provided a computer implemented method for processing data, the method comprising
retrieving a first document;
extracting first data from the first document;
ordering the first data into a first data structure using a set of translation tables; wherein the first data structure has a first format;
retrieving a second document;
extracting second data from the second document;
ordering the second data into a second data structure using the set of translation tables; wherein the second data structure has a second format; wherein the first data and the second data comprise a plurality of entities, and
comparing entities from the first data structure and the second data structure to identify matching entities.

For instance, the first data structure may be a first structured table, and the second data structure may be a second structured table. The entities may include various string of characters, which may be alphabetic characters, numerals or alphanumeric characters.

Optionally, the translation tables are derived from a common ontology representing relationship between entity classes present in the first document and the second document.

Optionally, extracting second data from the second document is performed using an extraction table having a predefined format configured to pre-order the second data.

Optionally, the first format of the first data structure matches a predefined data model.

Optionally, ordering data comprises executing a natural language processing algorithm configured to process data using the set of translation tables.

Optionally, extracting data comprises executing an optical character recognition algorithm configured to identify metadata. For example, metadata may include page co-ordinate, page numbers, page headers, table dimensions, table column headers etc. . . .

Optionally, the natural language processing algorithm is configured to identify primitive entities and to label each primitive entity with an attribute among a set of attributes.

Optionally, the set of attributes comprises at least one of a technology attribute, an action attribute, a destination attribute, an origination attribute, a location attribute, a country attribute, and a rule attribute.

Optionally, the natural language processing algorithm is configured to identify a hierarchy between entities. For example the hierarchy may include a parent/child relationship between entities.

Optionally, the set of translation tables comprises at least one of a service reference definition table, a service attributes table, a service to location mapping table, a location mapping table, a location rule definition table, and a location to country mapping table.

Optionally, the method further comprises executing a machine learning algorithm configured to analyse metadata to identify patterns or structures associated with a particular type of tables. For example the tables may be different types of telecom tables such as a telecom usage detail table, a telecom charges table, etc. . . .

Optionally, the method further comprises collecting training data and training the machine learning algorithm using the training data. For instance the training data may include a plurality of data sets for different types of tables, each set comprising input data and output data.

Optionally, the machine learning algorithm comprises a classifier of tables for classifying table data.

Optionally, the method comprises comparing the metadata to identify one or more sets of related data; for each set extracting and merging related data into a merged dataset; and identifying a class associated with the merged dataset using the natural language processing algorithm. For instance related data may be data that belong to a same table or a same section of a document or data which can be understood together in a specific context. The related data may be related entities.

Optionally, the optical character recognition algorithm is configured to identify and extract text data and table data from the first and second documents.

Optionally, the natural language processing algorithm is configured to classify table data into several classes and to combine table data having a same class.

Optionally, the first document has a first document structure, and wherein the second document has a second document structure different from the first document structure.

For instance the first document structure may include a structure of a financial document such an invoice, and the second document structure may include a structure of a legal document such as a contract.

Optionally, the first document and the second document are telecommunication documents. For instance the first document and the second documents may describe telecommunication products and services. The first document may be a telecommunication invoice and the second document may be a telecommunication contract.

Optionally, comparing entities is performed using the set of translation tables.

For instance the several translations tables may be used to derive that an entity from the first data structure matches or correspond to an entity in the second data structure. Matching entities may be entities that belong to a same class and attribute.

Optionally, the method comprising executing a decision software engine configured to analyse the first and second data structures based on client specifications inputs and generating a report based on the analysis.

According to a second aspect of the disclosure there is provided a system for processing data, the system comprising a communication module configured to retrieve a first document and a second document;
a first database configured to store the first and second documents;
a processor configured to extract first data from the first document; and to order the first data into a first data structure using a set of translation tables; wherein the first data structure has a first format; to extract second data from the second document; and to order the second data into a second data structure using the set of translation tables; wherein the second data structure has a second format; wherein the first data and the second data comprise a plurality of entities, the processor being configured to compare entities from the first data structure and the second data structure to identify matching entities.

Optionally, the further comprises a second database for storing the first data structure and the second data structure, and a third database for storing the translation tables.

Optionally, the processor is configured to load a data interpretation model, and to execute a natural language processing algorithm to perform classification based on the data interpretation model. For example the data interpretation model may be an ontology.

According to a third aspect of the disclosure there is provided a non-transitory computer-readable data carrier having stored thereon instructions which when executed by a computer cause the computer to carry out the method of the first aspect.

The options described with respect to the first aspect of the disclosure are also common to the second and third aspects of the disclosure.

DESCRIPTION OF THE DRAWINGS

The disclosure is described in further detail below by way of example and with reference to the accompanying drawings, in which:

FIG. 7A is a translation table for service reference definition;

FIG. 7B is a translation table for service attributes;

FIG. 7C is a translation table for service to location mapping;

FIG. 7D is a translation table for location mapping;

FIG. 7E is a translation table for location rule definition;

FIG. 7F is a translation table for location to country mapping;

FIGS. 8 (A-B) is an example of a structured table obtained from a contract document;

FIGS. 9 (A-B) is a data model for use with invoice document;

FIG. 10 is an example of a structured table from an invoice document;

FIG. 11 is a table illustrating how the structured tables of FIGS. 8 and 10 can be mapped together to make meaningful inferences;

FIG. 12 is an excerpt from an exemplary invoice;

DESCRIPTION

Figure 1:
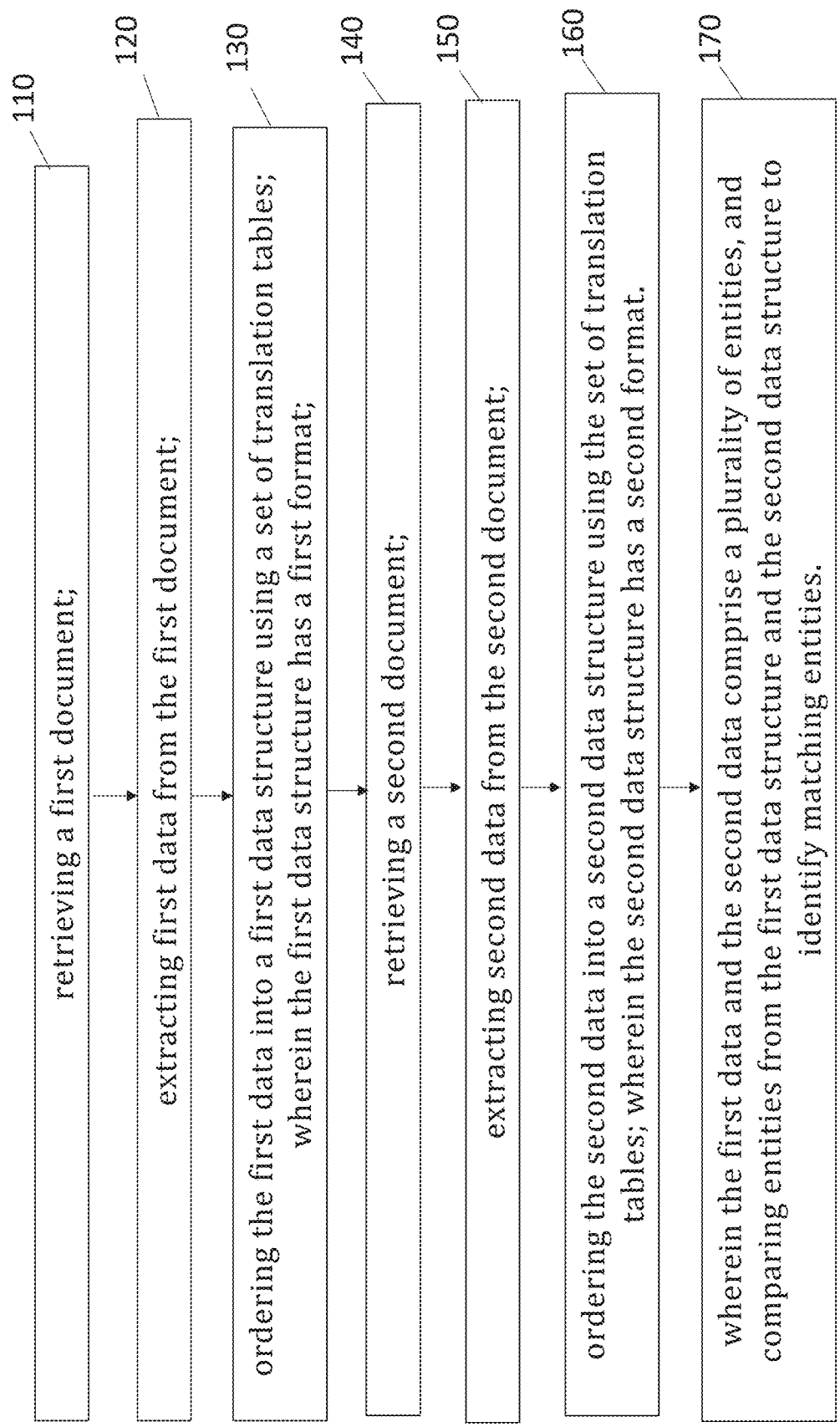
FIG. 1 is a flow chart of a method for processing data according to the disclosure.

FIG. 1 is a flow chart of a method for processing data according to the disclosure.

The method may be used with different types of documents, that is documents having different document structures. For instance a document structure may define the way information is organised in the documents with sections, paragraphs etc. . . . For example a legal document has a different document structure compared to a financial document or a marketing document.

At step 110 a first document is retrieved. For instance the first document has a first document structure. The first document structure may be a structure of a financial document, such as an invoice.

At step 120 first data from the first document is extracted.

At step 130 the first data is ordered into a first data structure using a set of translation tables. The first data structured has a first format.

At step 140 a second document is retrieved. For instance the second document has a second document structure. The second document structure may be of a legal document, such as a contract.

At step 150 second data is extracted from the second document.

At step 160 the second data is ordered into a second data structure using the set of translation tables. The second data structured has a second format. The first and second data structures may be structured tables.

The first format of the first data structure may match a first predefined data model. Similarly the second format of the second data structure may match a second predefined data model. Depending on the document structure, the first predefined data model may be distinct from the second predefined data model.

Different data models may be set for different types of documents. A data model may provide a list of classes in which each class is associated with a list of corresponding attributes and each attribute is associated with a type of primitive entity.

The first data set and the second data set comprise a plurality of entities. An entity may be formed by a string of characters, which may be alphabetic characters, numerals or alphanumeric characters. For example an entity may be a single word, or a short sentence, a date, a numerical value, etc. . . .

At step 170 entities from the first data structure and the second data structure are compared to identify matching entities. Comparing entities may be performed using the set of translation tables.

The step of extracting data may be performed by executing an optical character recognition algorithm OCR configured to identify metadata in the documents. Example of metadata may include page co-ordinate, page numbers, page headers, table dimensions, table column headers etc. . . .

The metadata may be compared to identify one or more sets of related data. Related data may be data that belong to a same table or a same section of a document or data which can be understood together in a specific context. For example a length of time of "2 minutes" may be connected or related to a corresponding charge of "0.5 units of currency".

For instance metadata may be used to find multiple source tables within the one or more documents, the source tables having common characteristics such as table dimension or headers etc. These source tables are likely to share related data and are identified as such. For each set, the related data are extracted and merged into a merged-dataset. For instance the related data may be merged into a merging table having a particular format or template.

The step of ordering data may be performed by executing a natural language processing algorithm (NLP) configured to process data using the set of translation tables. A natural language processing algorithm may be any algorithm capable of processing language data to make it understandable by a computer.

The method may be used to process various telecom documents such as telecom invoices and telecom contracts. A telecom invoice may have between 5 and 20 different sections and thousands of pages. The system and method of the disclosure can be used to reconstruct each section in a structured format to return various information in a desired way.

The first document structure may include a structure of a financial document such as an invoice, and the second document structure may include a structure of a legal document such as a contract. For example the document structure of a financial document such as an invoice may tabulate several primitive entities including alphanumerical values, service numbers, product names, dates etc . . . . The document structure of a legal document may contain several sections in which a minimal agreement term is provided with associated values.

Figure 2A:
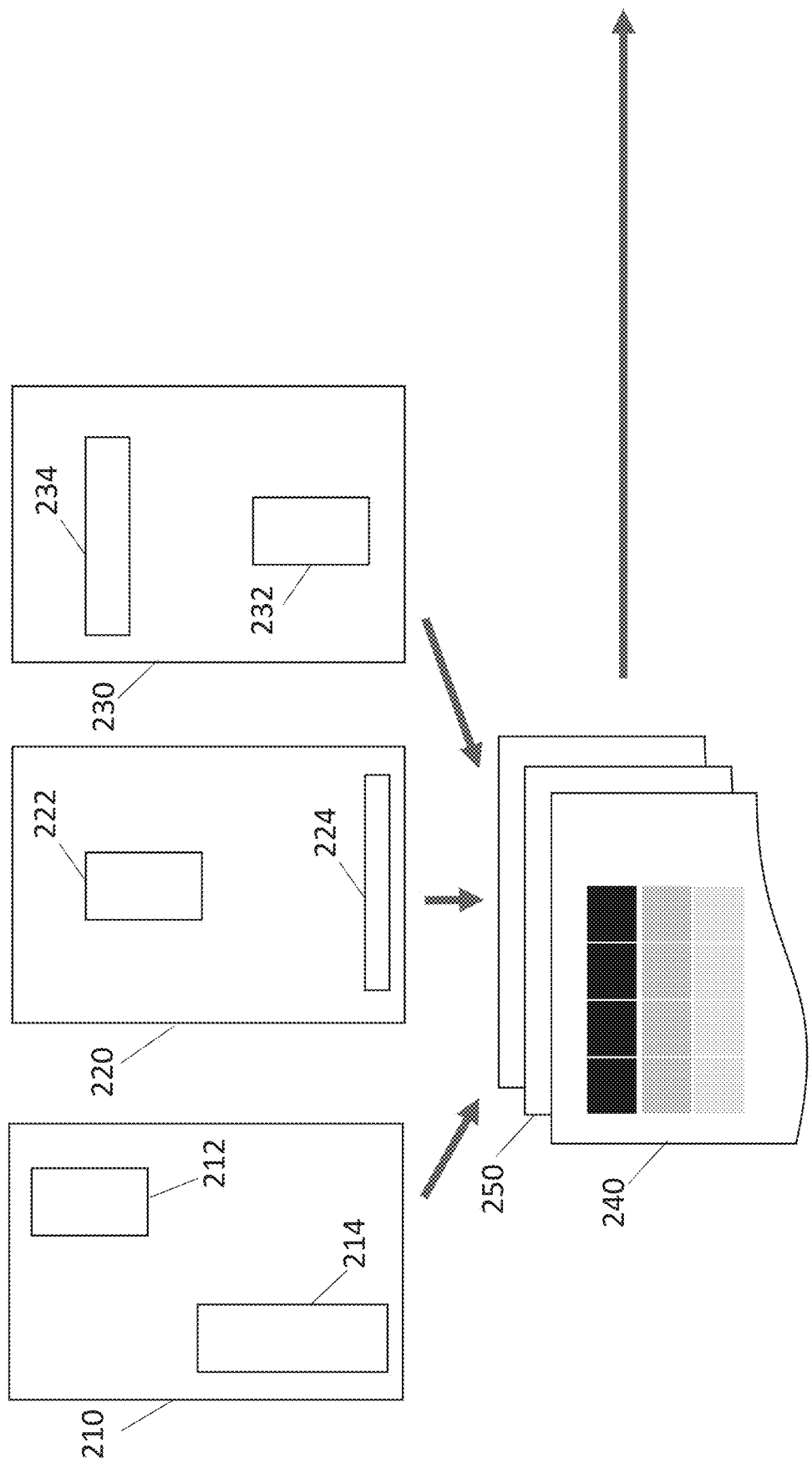
FIG. 2A is a diagram illustrating data extraction and merging of extracted data.
Figure 2B:
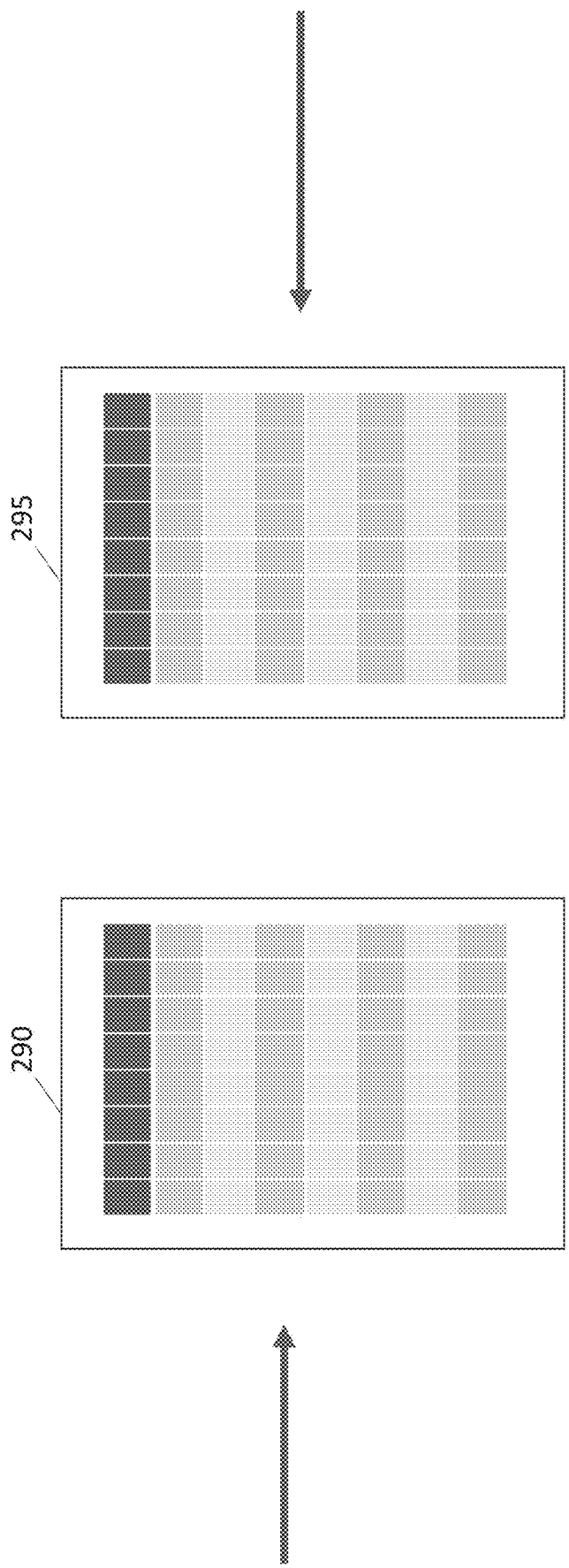
FIG. 2B illustrates a first structured table obtained from merged data obtained from a first type of document, and a second structured table obtained from merged data from a second type of document.

FIG. 2 is a diagram illustrating the data extraction process and the generation of data structures. FIG. 2A illustrates the data extraction and merging of related data. This process can be performed for different types of documents, having different document structures separately. FIG. 2B illustrates a first data structure obtained from merged data obtained from a first document, and a second data structure obtained from a second document.

In FIG. 2A three document pages 210, 220 and 230 are shown. Each page may belong to document of a particular type, for instance a contract document. Each page may have several data regions. In this example page 210 has two data regions 212 and 214, page 220 has data regions 222 and 224 and page 230 has data regions 232 and 234.

Metadata may be used to identify related data from different regions. For instance metadata may be used to find that regions 212, 222 and 232 are source tables having common characteristics, for instance same table dimension. Similarly metadata may be used to find that regions 214, 224 and 234 are source text sharing a particular characteristic such as a same or similar section header.

The related data from the source tables 212, 222 and 232 are extracted and merged into a merged-dataset or merging table 240. Similarly the related data from the source text 214, 224 and 234 are extracted and merged into a merged-dataset or merging table 250.

The natural language processing NLP algorithm is then executed to order data from the merged-datasets 240 and 250 using the set of translation tables to obtain a data structure for instance a table having specific format that facilitates further analysis or comparison between various data.

The process can be repeated for pages of a document having another document structure, for instance an invoice document.

FIG. 2B illustrates a first data structure, in this example a first structured table 290 obtained from merged data obtained from a first type of document, and a second data structure, in this example a second structured table 295 obtained from merged data from a second type of document. The first structured table 290 may contain data extracted from a contract and second structured table 295 may contain data extracted from an invoice.

When considering pages of telecom documents, possible example of classes may include bill section (class1), cost centre (class2), bill service (class3), bill product (class4) and charges (class5) among others.

For instance in FIG. 2A the information in table 240 may belong to class 3 (bill service) and the information in table 250 may belong to class 5 (charges).

Figure 3:
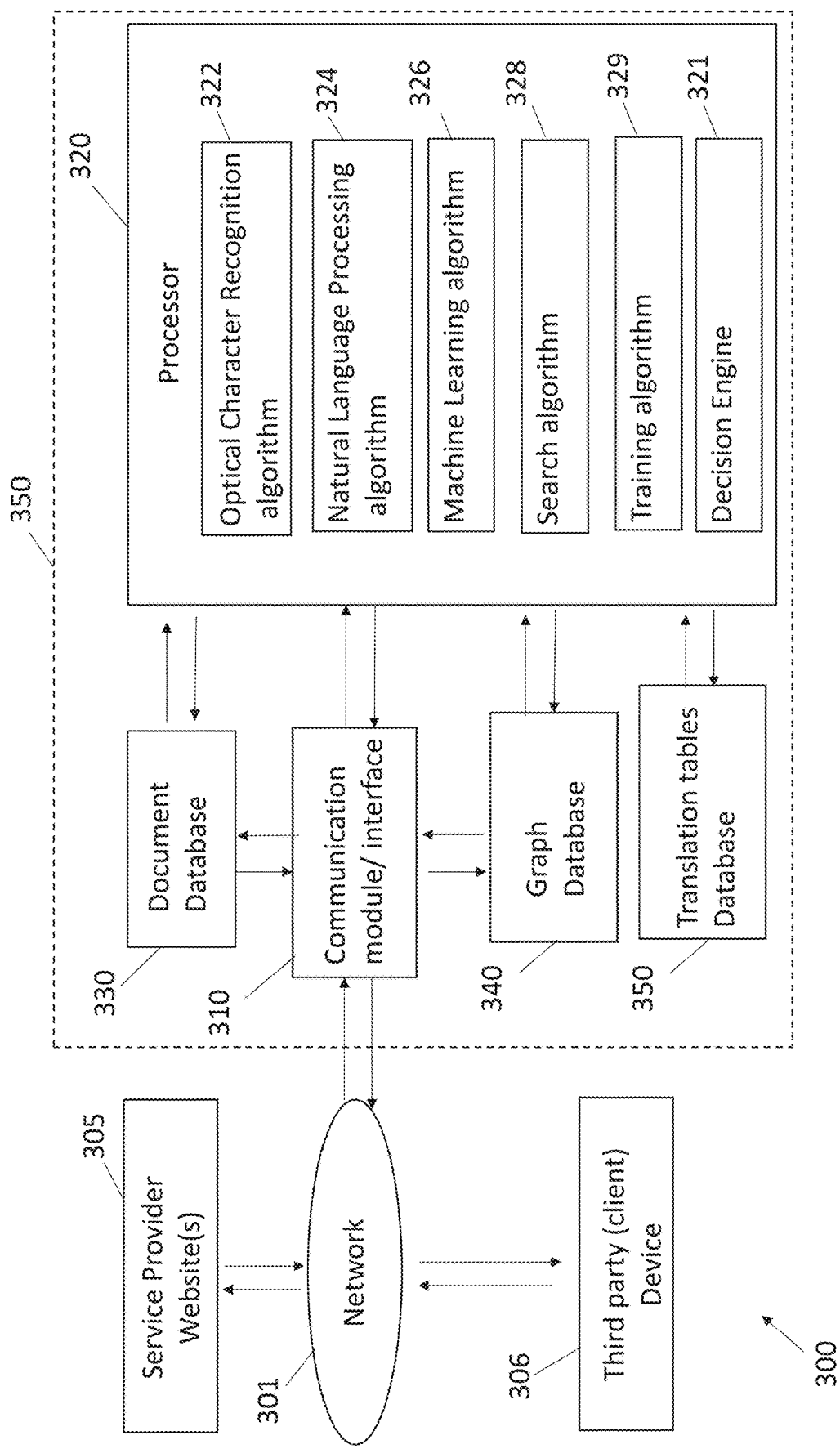
FIG. 3 is a diagram of a system for implementing the method of FIG. 1.

FIG. 3 illustrates a system for implementing the method of FIG. 1. FIG. 3 shows a system or platform 350 in communication with one or more websites 305 and to a third party device 306 via a network 301.

The website 305 may be a website of a service company such as a telecommunication company or operator providing telecommunication contracts. The third party device 306 may be a personal computer or a mobile phone of a client using the platform 350.

The system or platform 350 includes a communication module also referred to as communication interface 310, a processor, also referred to as data processor 320, a first database referred to as document database 330, a second database referred to as graphical database 340, and a third database 350 referred to as translation table database.

The processor 320 is configured to load and execute several algorithms including an optical character recognition OCR algorithm 322, a natural language processing NLP algorithm 324, and a machine learning algorithm ML 326. The processor 320 may also be configured to run a search algorithm 328 and a training algorithm 329 for training the machine learning algorithm 326. Data may be collected to create a training data set. The training dataset may include tables of different types, for instance a "telecom usage detail" table, a "telecom charges" table etc. . . . for which each type of table may have a specific data structure. The training data set may then be used to train the ML algorithm so that it can learn to recognise different types of tables. The ML can then be used to improve the prediction of certain labels, e.g. what is the correct label to classify the table type, is it a summary or detailed table? Etc. The ML may also be used to improve the output of the NLP algorithm (See example provided below with respect to FIG. 12). The machine learning algorithm may comprise a neural network algorithm comprising a set of weights and biases. The communication module 310 is coupled to the processor 320 and is configured to communicate with external websites 305 or client devices 306 via the network 301.

With reference to FIG. 2, the processor may be configured to generate the structured tables 290 and 295 having a predefined structure or template filled with the data from the merged-dataset. Instructions may be provided which are automatically recognised and processed by the system to determine how the content elements are to be assembled and presented in the new document 290 or 295.

The second (graph) database 340 is configured to store structured data provided by the processor 320, such as the first and second structured tables 290 and 295 described in FIG. 2. The third database 350 is configured to store the translation tables. The graph database 340 may be used to interrogate the first data structure 290 and the second data structure 295 or perform data analysis, for instance using the decision engine 321.

It will be appreciated that the communication module 310, the processor 320 and the databases 330 and 340, may be implemented in different fashions. For instance, these elements of the system may be included in a single server; alternatively they may be distributed in a plurality of different servers. Data stored in the databases 330, 340 and 350 may also be stored in the cloud.

Figure 4:
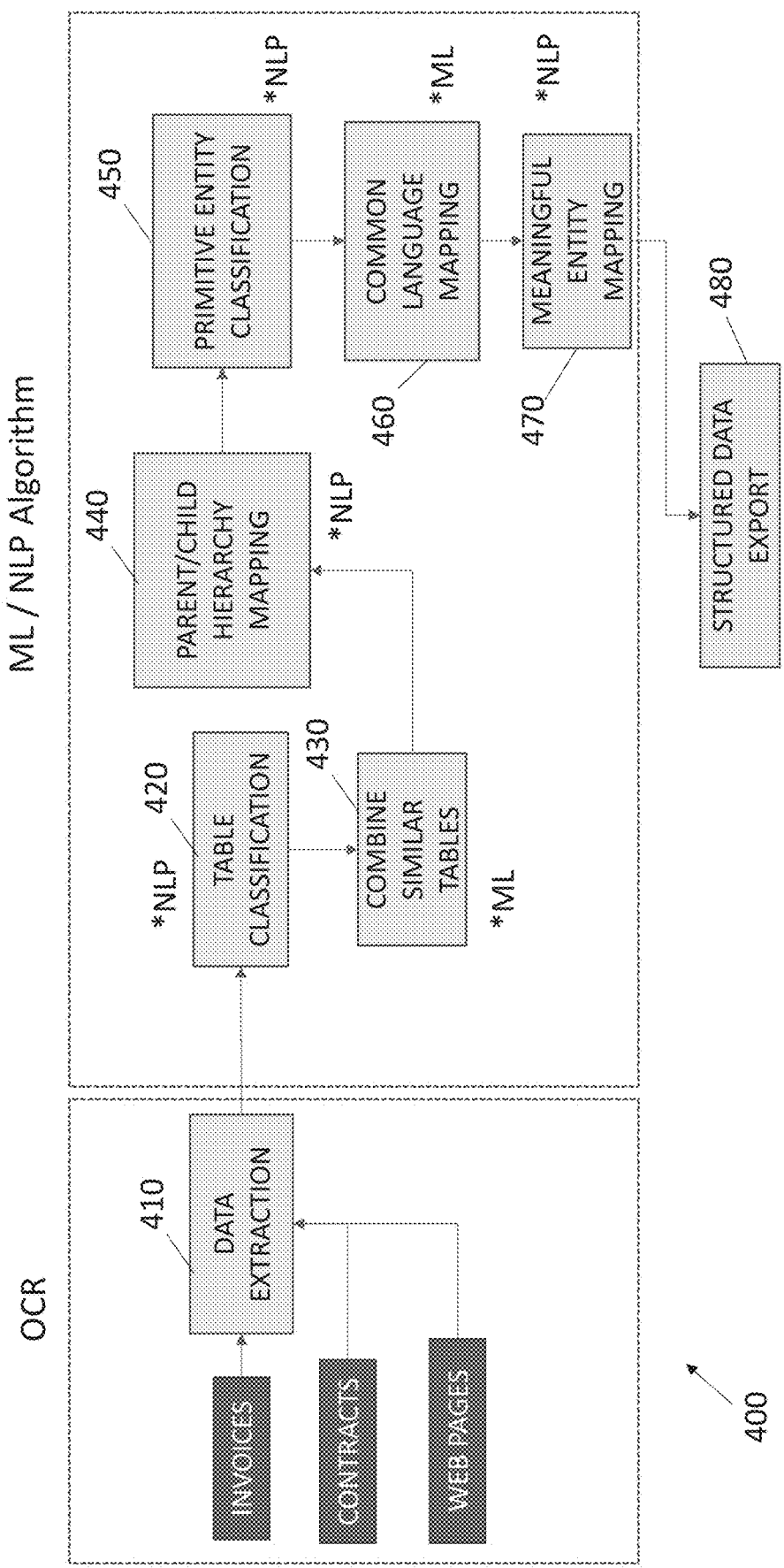
FIG. 4 is a diagram illustrating the operation of the system of FIG. 3.

FIG. 4 is a diagram illustrating the operation of the system of FIG. 3. In operation the communication module 310 may communicate with a service provider website 305 to identify one or more relevant documents as well as website data. Document and data identification may be achieved using the search algorithm 328. The communication module 310 may also receive documents directly from the third party client device 306. The documents may include legal documents such as contracts, financial documents such as invoices, marketing documents, information obtained directly from webpages, among others. The documents may therefore be received in different machine readable format including pdf, html, etc. . . . These documents may contain structured data, unstructured data and semi-structured data. Structured data refers to data or information organized in a pre-defined manner or according to a pre-defined data model while unstructured data that is data that does not have a pre-defined data model or is not organized in a pre-defined manner. Semi-structure data refers to data or information that does not have a strict structural framework but have some structural properties. The communication module 310 then downloads the relevant documents and store them in the document database 330.

The processor 320 then executes the optical character recognition algorithm OCR 332 to identify metadata within the documents. Example of metadata may include page co-ordinate, text coordinates, page numbers, page headers, table headings, table dimensions (rows vs columns), table column headers, among others. The metadata are used to extract specific information or data from the documents.

The extracted information (step 410) may include text data, numerical data, alphanumerical data, table data, graphical data, and other types of data. Text data may include plain text, such as contract clauses from a legal document. Table data may include tables of different types, that is tables having different characteristics, including number of rows and columns, total number of cell, number of sub columns or sub rows within a cell etc. . . .

The processor 320 then executes the natural language processing NLP algorithm 324 to classify data extracted from the documents. For instance the NLP may be used to classify extracted source tables (step 420) and combine source tables of a same type with each other (step 430).

The OCR can identify table metadata but may not be able to identify that some data are related to each other or belong to a same table. This may be the case if a table starts on a first page and finishes on a second page. The NLP may be used to recognise that the data of the first page and second page belong to a same table.

The machine learning algorithm ML 326 may be provided with a classifier of tables to assist the table classification step 420. The ML algorithm may be used to analyse metadata to identify patterns or structures associated with a particular type of tables. For instance the ML algorithm may learn to recognise a particular type of table, for instance a "telecom usage detail" table or other types of tables which may or may not be pre-defined.

The NLP algorithm is then used to perform a data hierarchy mapping (step 440). Such a mapping step allows to identify which information or entity is associated with which concept or class.

The processor may execute several Named Entity Recognition (NER) modules to identify entities modelled in a predefined ontology. An ontology may be described as an interpretation model having several set of concepts (also referred to as classes) and categories in a particular subject area (also referred to as domain) and that displays the concepts properties and the relations between them.

The NLP algorithm may include custom Named Entity Recognition (NER) scripts and a Piece-of-Sentence (POS). The custom Named Entity Recognition (NER) scripts may be trained to recognise entities where key words are sufficiently descriptive. Similarly Piece-of-Sentence (POS) may be trained to identify certain phrasing and sentence structures. In addition, customed pattern matching rules may also be used. Classes may be conceptual and do not necessarily correspond to literal text. The named entity recognition NER engines may be trained on thousands of scenarios to correctly associate literal text to its intended class.

Then the NLP is used to classify primitive entities (step 450). For instance the character string or entity "making a call" may belong to a "service reference" class. Similarly pattern matching rules can be used to classify "charging" entities against a custom charging ontology.

Then language mapping (step 460) may be used to recognise service reference attributes, for instance a service action or a service destination. The ML algorithm may use language mapping tables (part of the translation tables) to perform the language mapping step. The translation tables can be used to map meanings between languages, and to map inferences of a phrase. For example "Calls made from Europe to UK" infers "Calls" as a usage action, "Europe" as an origination of the usage, "UK" as a destination of the usage. Language mapping could include, for example, taking the Chinese phrasing for "Calls made from Europe to UK" and providing an English translation that can link to the correct inferences.

The processor 320 may also execute a custom "closeness function" that maps how close each entity is to one another using the page co-ordinates from the metadata file.

At step 470 a meaningful entity mapping is obtained in which entities are mapped against the ontology. For example, a correct set of charges may be allocated to a correct service number that generated those charges.

At step 480 the processor 320 can then export structured data for instance a structured table based on the mapping at step 470.

Therefore the system of the disclosure can be used to model classes and sub-classes and extract relevant data from specific documents. For instance extracting data from a detailed telecommunication invoices. Then data can be re-organised so as to re-create a financially accurate representation of each line item. The system can be used to represent accurate detailed line items from very large invoices, for instance invoices having thousands of pages. It allows handling the very different ways in which suppliers describe their own products, billing and contracts.

Figure 5:
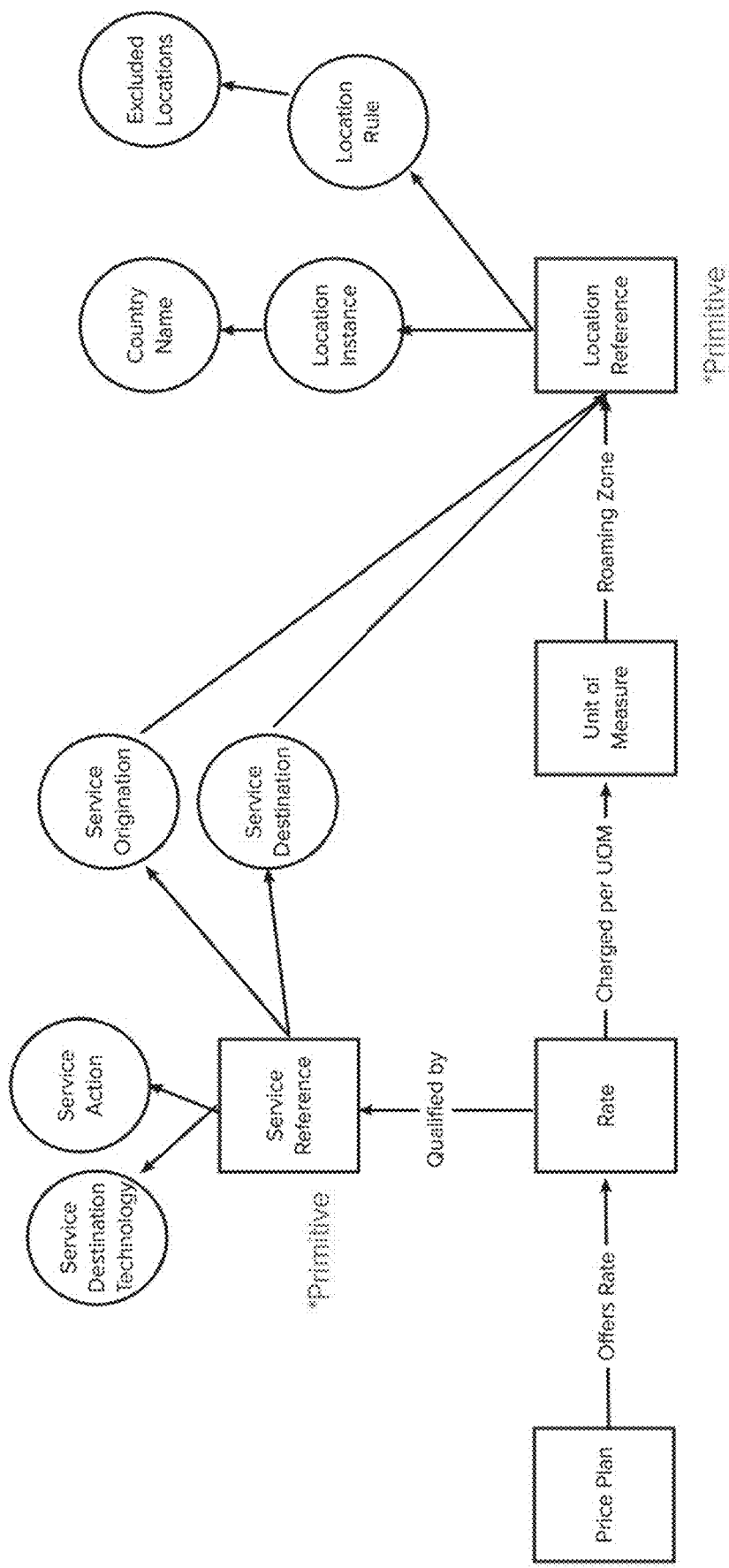
FIG. 5 is a diagram of an exemplary interpretation model or ontology.

FIG. 5 is a diagram of an exemplary interpretation model or ontology. The boxes represent a class, also referred to as concept. Each class may hold sub-classes, or sub-concepts, and every class is related to one other in some way that is interpretable by a machine. This machine-readable structure is called an ontology (or a taxonomy) in which there is a hierarchical relationship between classes.

Arrows between boxes indicate a relationship between classes. The NLP algorithm may be configured to identify entities that belong to a specific class, as well as relationship between classes.

The circles represent attributes. For instance the class service reference may have several attributes. In this example four attributes are shown: service destination technology, service action, service origination and service destination. The ML algorithm may be configured to identify attributes associated with a specific class.

It will be appreciated that depending on the application and the type of documents used different ontologies or modelled may be provided. Classes and sub-classes are modelled into custom ontology and taxonomy to represent relevant data from supplier contracts, documents containing terms and conditions, and marketing websites.

In this example the ontology of FIG. 5 is designed to be compatible with different types of documents, for instance financial documents such as invoices and legal documents such as contracts. The ontology has an invoice domain and a contract domain. Each domain contains several classes that may belong to both the invoice domain and the contract domain.

A document may contain several string of text. For instance a telecommunication contract may include tables and plein text sections.

An example of such a contract is the Vodafone Business Advance Price Plan Guide (v 1.0 from 23 Aug. 2018) which can be accessed at https://www.vodafone.co.uk/cs/groups/configfiles/documents/vfcon072748.pdf This document includes several text strings including:
Roaming Zone
Making calls in Europe and Back to the UK
Making Calls From Europe to USA and Rest of World
Making Calls From Europe to USA and Rest of World with International Discount 1
Receiving calls and texts In Europe (No Daily Charge will apply)
Sending texts
Using the internet
Etc. . . .

FIG. 6 is an exemplary extraction table and export from a contract document. The extraction table 600 is an example of a merged dataset for instance reference 240 in FIG. 2.

The information refers to page 12 of the sample contract vfcon072748 mentioned above. Only a few lines of extraction table are provided for illustrative purpose.

FIGS. 6A and 6B shows a table 600 gathering data from four source tables labelled SourceTable0, SourceTable1, SourceTable2 and SourceTable3. Only twenty rows labelled 610-619 are represented. The table 600 gather data relating to "travelling and using devices abroad" as per SourceTable0, roaming zone as per SourceTable1, charge as per SourceTable2 and action as per SourceTable3.

Figure 6C:
FIGS. 6 (A-D) is an exemplary extraction table or merged data set from a contract document.

FIGS. 6C and 6D the primitive entities and entity relationship associated with the rows 610-619.

For instance from the data shown in row 712 in table 700 two primitive entities are identified: the entity "USA and Canada" which belong to class service reference and the entity "making calls from Europe and rest of world" which belongs to class ParentServiceReference. In addition three entity relationships are identified: 12 p, per minute, EuropeZone1.

Translation tables, also referred to as matrices, may be used to associate an entity, for instance a particular text string to a corresponding class or concept, for example a service class or a location class. Each class may contain several entities. For example the class service may include a contract starting date entity, a contract end date entity, etc. . . . The set of translation tables allows NLP and/or ML algorithm, via the processor, to search and tag primitive entities faster and more accurately. A primitive entity such as a particular text string can be classified in a fast and reliable way. For example in the context of an invoice the alphanumerical string "300 minutes to 084 and 087 numbers" may be classified to a product class. Similarly in the context of a contract a minimum contract term may be linked to a specific service plan.

The ML algorithm may be used to recognise a primitive entity such as a date and qualify the date by recognising a specific type of date, for instance a contract starting date. There the primitive entity can be labelled or tagged as a specific entity.

FIG. 7A to 7F provide several examples of translation tables that may be used by the NLP algorithm and the ML algorithm.

FIG. 7A shows a translation table for service reference definition. The table 710 may be used to recognise text string or entity relating to a service reference. In this example some text string like "sending texts" are only associated with service reference, while other strings like "Making calls in Europe and back to the UK" are associated with both service reference and a location reference.

FIG. 7B shows a translation table for service attributes. The table 720 may be used to interpret a particular text string relating to a service reference by associating several attributes. In this case four attributes are provided labelled service action, service origination, service destination and service destination technology. For example the service reference "Making calls in Europe and back to the UK" has the action: making calls, the origination: Europe, and the destination UK.

FIG. 7C shows a translation table for service to location mapping. The table 730 may be used to associate a particular text string relating to a service to one or more location instances. For example the service reference "Making calls in Europe and back to the UK" is associated with two location instances Europe, and the UK. The service reference "Making calls from Europe to the USA and rest of world" is associated with three location instances Europe, USA and all countries except USA and Europe.

FIG. 7D shows a translation table for location mapping. The table 740 may be used to associate a particular location reference to a particular location instance and a location rule. For example the location reference Europe is associated with the location instance Europe and has no location rule. The location reference Country is associated with the location instance Any Country and has the location rule isLocationRule. Similarly, the location reference World Zone is associated with the location instance Any Country Not Europe and has the location rule isLocationRule.

FIG. 7E shows a translation table for location rule definition. The table 750 may be used to associate a particular location reference to a particular excluded location. For example the location reference World Zone excludes the location Europe. Similarly the location reference Rest of World excludes the locations USA, Canada and Europe.

FIG. 7F shows a translation table for location to country mapping. Only some countries are represented. The table 760 may be used to associate a country instance to a location instance. For example the country Austria is associated to the location instance Europe Zone 1. The country USA is associated to the location instance USA and Canada. The country Andorra is associated to the location Rest of World Zone 2.

The translation tables of FIG. 7 may be used to map specific information from the structured export/merged data set to return a correct contextual result.

FIG. 8 (A-B) is an example of a structured table obtained from a contract document. For instance this may be an example of the data structure/structured table 290 in FIG. 2. This example shows how the structured export (merged data set) of FIG. 6 can be filtered using the set of translation tables of FIG. 7. In this instance the structured export/merged data set 600 is filtered for part of a service being used in Canada as a result of a specific query. It could be filtered for services being used in other countries such as the USA, for instance. It will be appreciated that different data structure can be obtained from the merged data set.

FIGS. 9A and 9B illustrate a data model. This data model is an example data model that can be used for an invoice. The domain invoice may have several classes and each class may have several attributes also referred to as detailed entity. The data model 900 lists several classes for instance "Product" or "Service" or "Supplier". Each class is associated with several attributes. For example the class Supplier has 4 attributes: supplier_name, company_registration_number, supplier_country, supplier_address. Then each attribute/detailed entity is associated with a primitive entity. For instance the attribute supplier_name is associated with primitive entity of a type "organization", while the attribute "supplier address" is associated with a primitive entity of type "block of text".

The class line item type has four attributes: Summary, Detailed, Overview, Breakdown. Each attribute has a primitive entity of the type section heading. The primitive entity called "Section Heading" may map to one of the four attribute/detailed entities.

The data model 900 may be used by the NLP to map and reorganise invoice data.

FIG. 10 is an example of a structured table from an invoice document. For instance this could be an example of second structured table 295 in FIG. 2. In this instance the structured table 1000 is shown only for the usageclass, however other classes may also exist (not shown). The structured table in the Usage class is populated with anonymised invoice data.

FIG. 11 is a table illustrating how the structured table 1000 derived from an invoice document and the structured table 800 derived from a contract document can be mapped together to make meaningful inferences (as mentioned above a structed table 800 may be obtained as a result of a specific query, for instance in relation to services involving the USA). The entities from the invoice structured table 1000 and the contract structured table 800 are mapped to one another. The translation tables used to extract data from invoices and contracts are also used to compare where matching or corresponding elements occur in the structured tables 800 and 1000. For example: "France" (1101) is mapped to the location reference the supplier makes of "Europe" (1102); while "Making call" (1103) as an action maps to an inference of the same action (1104) within the service bundle reference the supplier makes of "Making calls from Europe to USA and Canada".

In more details "Making calls from Europe to USA and Canada" is what's written in the contract. FIG. 7B provides a mapping of the "ServiceAction" of making calls, and a "ServiceOrigination" of Europe (meaning the calls are originating from Europe)."Europe" maps to a series of "LocationInstance" on FIG. 7*c* and cross-checked against FIG. 7*d* for any possible rules implied by the original statement. Each "LocationInstance" is then mapped to FIG. 7F to find what each of the countries are. As "France" is a country within Europe, it is returned as a "CountryInstance" from FIG. 7F.

Some entities present in the structured table 1000 can therefore be correlated with entities present the structured table 800.

It can be easily identified that the volume of calls within the invoice relates to the service bundle in the contract that includes "making calls from Europe to USA and Canada".

The contract example shown only contains rates for the "Business Advance" price plan, however the system supports an unlimited range of price plans and suppliers.

Comparisons can also be made to other service bundles. As service bundles are linked to other contracts and offerings, the data structures/structured tables provide a way to compare multiple contracts against each other.

By returning all relevant Rates, Conditions, Discounts, Eligibility and Price Plans, this creates the dataset required for a Decision Engine to work. A Decision Engine can be used to create meaningful transparency across documents and perform complex financial calculations.

Figure 12:
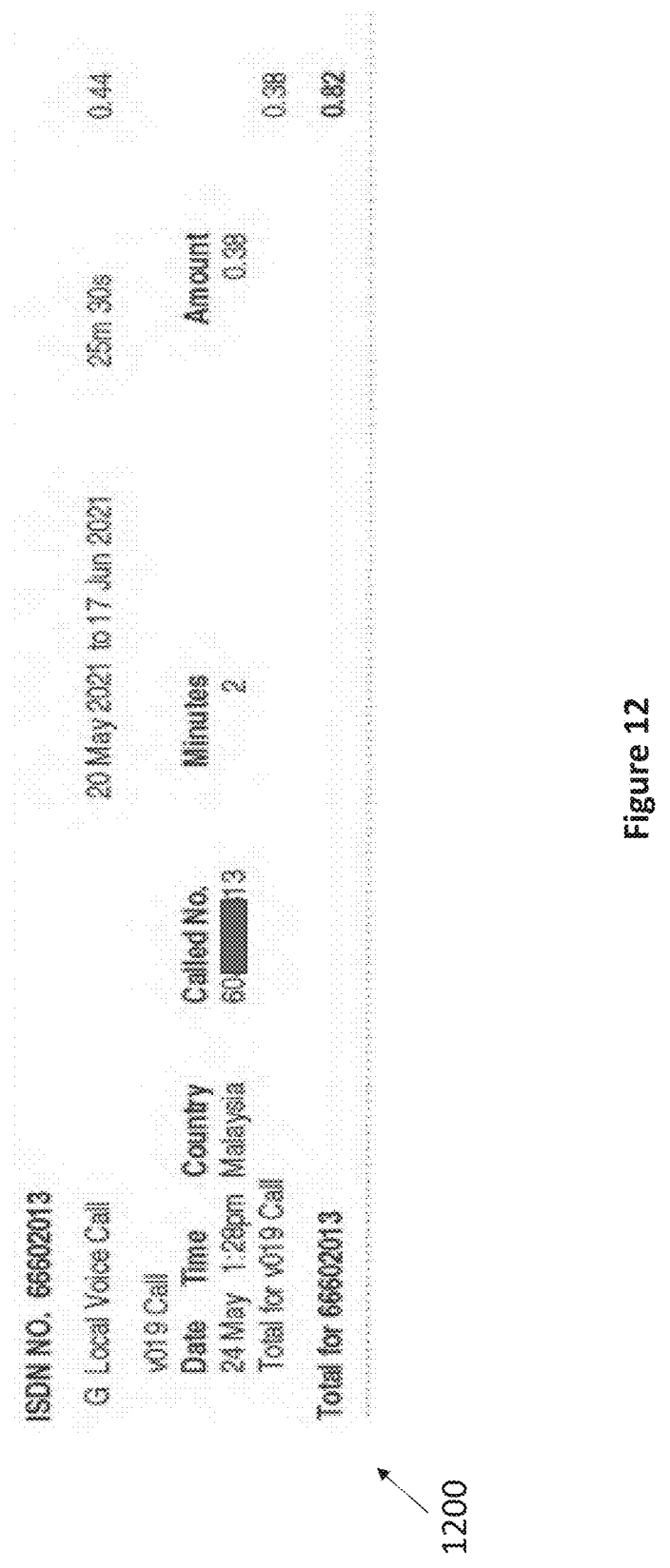

FIG. 12 shows an excerpt from an exemplary invoice.

A human reading the invoice 1200 might understand that the numeral "0.44" shown is a charge for "Local Voice Call" while the numeral "0.38" underneath is a charge for a call made to 60-----13.

However, a machine-translation would have trouble in a few areas. For instance looking at the string of alphanumeric characters "20 May 2021 to 17 Jun. 2021", the NLP will identify this information as a date. But what kind of date is it? The context in which the date exists changes its final meaning. It could be a product start date (or a product end date) defined as the starting date in which a product is charged. It could be a usage made date—defined as the date in which some usage is made, such as a call, text message, or data connection. It could be an invoice date—defined as the date an invoice is issued. It could be a contract start date or contract end date—defined as the date in which a contract has begun, often referenced in invoices.

In addition the way context can be understood is also not straightforward. I) For instance, "Column headings" exist for the call made to 60-----13. Using a mapping of associations or inferences can be assigned to these columns. For example "Called No." has previously been associated to a dialled_number (which belongs in the target structured format) and that "Called No." has an inference of a Call.

The existence of the pre-existing association and the inference of this column being associated to a call being made adds to a weighting of decision factors to determine that the ambiguous column names of Date, Time, Amount Column headings:
   a. Date
   b. Time
   c. Country
   d. Called No.
   e. Minutes
   f. Amount II) No column headings exist for the top line of text values: G Local Voice Call, 20 May 2021 to 17 Jun. 2021, 25 m 30 s, 0.44

Reliance is made on the mappings and inferences of each text value that can be compared to each other:— G=maps to a legend of tax symbols shown at the bottom of theinvoice page—Local Voice Call=maps to a known product_description—20 May 2021 to 17 Jun. 2021=is recognised as dates. Also maps to a known text pattern where <date> to <date> means charge_start_date to charge_end_date—25 m 30 s=maps to a known text pattern where <number>m<number>s means minutes+seconds which maps to a duration field from the target structured format—0.44=a number of currency value There may be multiple mappings for each of these values that threaten to conflict with each other, e.g. G could be a tax symbol or a simple alphabet letter that is meant to form part of the Local Voice Call description.

The OCR algorithm detects that each of these text values are closest to one another and can be considered together.

The NLP algorithm works to assign a meaning to the most ambiguous text values: 0.44
   i. 0.44 could be a number or currency value
   ii. 0.44 is near to a text value that may mean charge_start_date and charge_end_date
   iii. 0.44 is near to a text value that is mapped to a known product_description which is associated to calls being made
   iv. 0.44 is near to a text value that could mean a tax symbol, or nothing at all
   v. The near text values are generally found near where a charge_amount field is found.
   vi. Could 0.44 be a charge_amount?

The ML algorithm is trained so that it can learn from feedback given by an end-user who can reinforce whether the NLP algorithm is correct or not through a user interface. As a result the ML can learn from each of the individual steps above to derive the correct label of 0.44 as a currency value.

III) No column headings exist and there exists only 1 nearby text values in the bottom row that shows a numerical value of 0.82.

Reliance is made on the key value pair which is the only other text value available:
   "Total for 66602013 0.82"
   "Total for" is stored as a known key-value for representing an aggregated sum charged to whatever identifier is mentioned in the Total for line. 0.82 can therefore be interpreted as a currency value that is an aggregated sum for 66602013 which can also be identified as a type of service_identifier.

Once completed deriving context and assigning a meaningful translation to each text value on the invoice, the translations are stored using a structured format.

Figure 13:
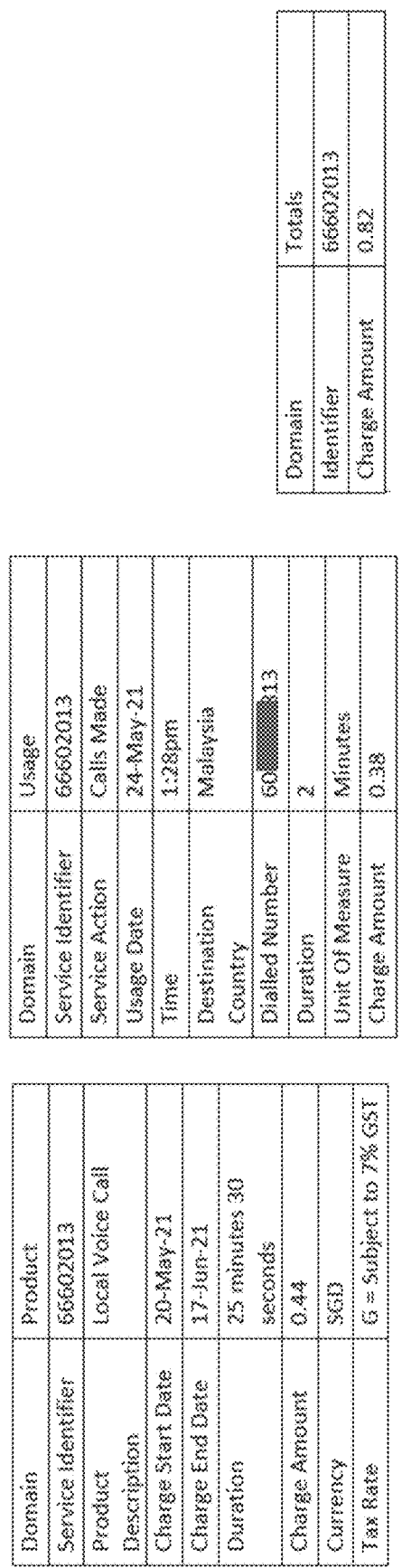
FIG. 13 is a structured table derived the invoice document of FIG. 12.

FIG. 13 shows a structured table having a specific structured format. The format of the structured table 1300 matches a predefined data model, for instance the data model 900 of FIG. 9.

The NLP is configured to order the invoice data extracted from the invoice document 1200 into the structured table 1300 using a set of translation tables.

The structured table 1300 has a format that represents various domains or classes. Three domains are illustrated: Products, Usage and Totals. Each domain has several fields or attributes. The domain "product" has 8 fields (service identifier, product description . . . ), the domain "Usage" has 9 fields and the domain "totals" has two fields.

When analysing the invoice 1200 the NLP identifies primitive entities for instance a date, a location or a numeral. Then using contextual information from the invoice including headings and grouping in and around the invoice, the NLP reorganises the data in the structured table 1300.

A skilled person will therefore appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A computer implemented method for processing data, the method comprising:
   retrieving a first document containing unstructured or semi-structured data or a combination of both;
   extracting first data from the unstructured or semi-structured data contained in the first document;
   ordering the first data into a first data structure using a set of translation tables; wherein the first data structure has a first format;
   retrieving a second document containing unstructured or semi-structured data or a combination of both;
   extracting second data from the unstructured or semi-structured data contained in the second document;
   wherein the extracting second data from the second document is performed using an extraction table having a predefined format configured to pre-order the second data;
   ordering the second data into a second data structure using the set of translation tables; wherein the second data structure has a second format;
   wherein the first data and the second data comprise a plurality of entities, and
   comparing entities from the first data structure and the second data structure to identify matching entities,
   wherein ordering the first data and the second data comprises executing a natural language processing algorithm configured to process the first data and the second data using the set of translation tables;
   wherein the natural language processing algorithm is configured to identify primitive entities and to label each primitive entity with an attribute among a set of attributes;
   wherein the set of attributes comprises at least one of a technology attribute, an action attribute, a destination attribute, an origination attribute, a location attribute, a country attribute, and a rule attribute.

2. The method as claimed in claim 1, wherein the translation tables are derived from a common ontology representing relationship between entity classes present in the first document and the second document.

3. The method as claimed in claim 1, wherein the first format of the first data structure matches a predefined data model.

4. The method as claimed in claim 1, wherein extracting data comprises executing an optical character recognition algorithm configured to identify metadata.

5. The method as claimed in claim 1, wherein the natural language processing algorithm is configured to identify a hierarchy between entities.

6. The method as claimed in claim 1, wherein the set of translation tables comprises at least one of a service reference definition table, a service attributes table, a service to location mapping table, a location mapping table, a location rule definition table, and a location to country mapping table.

7. The method as claimed in claim 1, further comprising executing a machine learning algorithm configured to analyse metadata to identify patterns or structures associated with a particular type of tables.

8. The method as claimed in claim 7, further comprising collecting training data and training the machine learning algorithm using the training data.

9. The method as claimed in claim 7, wherein the machine learning algorithm comprises a classifier of tables for classifying table data.

10. The method as claimed in claim 4, comprising
comparing the metadata to identify one or more sets of related data;
for each set extracting and merging related data into a merged dataset; and
identifying a class associated with the merged dataset using the natural language processing algorithm.

11. The method as claimed in claim 10, wherein the optical character recognition algorithm is configured to identify and extract text data and table data from the first and second documents.

12. The method as claimed in claim 11, wherein the natural language processing algorithm is configured to classify table data into several classes and to combine table data having a same class.

13. The method as claimed in claim 1, wherein the first document has a first document structure, and wherein the second document has a second document structure different from the first document structure.

14. The computer implemented method as claimed in claim 1, wherein the first document and the second document are telecommunication documents.

15. The method as claimed in claim 1, wherein comparing entities is performed using the set of translation tables.

16. The method as claimed in claim 1, comprising executing a decision software engine configured to analyse the first and second data structures based on client specifications inputs and generating a report based on the analysis.

17. A system for processing data, the system comprising:
a communication module configured to retrieve a first document and a second document, wherein the first document contains unstructured or semi structured data or a combination of both; and wherein the second document contains unstructured or semi structured data or a combination of both;
a first database configured to store the first and second documents; and
a processor configured to extract first data from the unstructured or semi-structured data contained in the first document;
to order the first data into a first data structure using a set of translation tables; wherein the first data structure has a first format;
to extract second data from the unstructured or semi-structured data contained in the second document using an extraction table having a predefined format configured to pre-order the second data; and
to order the second data into a second data structure using the set of translation tables; wherein the second data structure has a second format;
wherein the first data and the second data comprise a plurality of entities, the processor being configured to compare entities from the first data structure and the second data structure to identify matching entities, and
wherein the processor is configured to order the first data and the second data by executing a natural language processing algorithm configured to process data using the set of translation tables;
wherein the natural language processing algorithm is configured to identify primitive entities and to label each primitive entity with an attribute among a set of attributes;
wherein the set of attributes comprises at least one of a technology attribute, an action attribute, a destination attribute, an origination attribute, a location attribute, a country attribute, and a rule attribute.

18. The system as claimed in claim 17, further comprising a second database for storing the first data structure and the second data structure, and a third database for storing the translation tables.

19. The system as claimed in claim 17, wherein the processor is configured to load a data interpretation model, and to execute a natural language processing algorithm to perform classification based on the data interpretation model.

20. A non-transitory computer-readable data carrier having stored thereon instructions which when executed by a computer cause the computer to carry out the method of claim 1.

* * * * *

UNITED STATES PATENT AND TRADEMARK OFFICE
CERTIFICATE OF CORRECTION

Page 1 of 1

PATENT NO. : 12,001,446 B2
APPLICATION NO. : 17/719196
DATED : June 4, 2024
INVENTOR(S) : Richard Martin It is certified that error appears in the above-identified patent and that said Letters Patent is hereby corrected as shown below:

In the Specification

In the Description:

Column 9, Lines 46-47, change
"https://www.vodafone.co.uk/cs/groups/configfiles/documents/vfcon072748.pdf" to
--https://www.vodafone.co.uk/cs/groups/configfiles/documents/document/vfcon072748.pdf--

Signed and Sealed this
Twenty-third Day of July, 2024

Katherine Kelly Vidal
*Director of the United States Patent and Trademark Office*